Sept. 6, 1949.     G. E. DATH     2,481,006
FRICTION SHOCK ABSORBER
Filed May 20, 1946
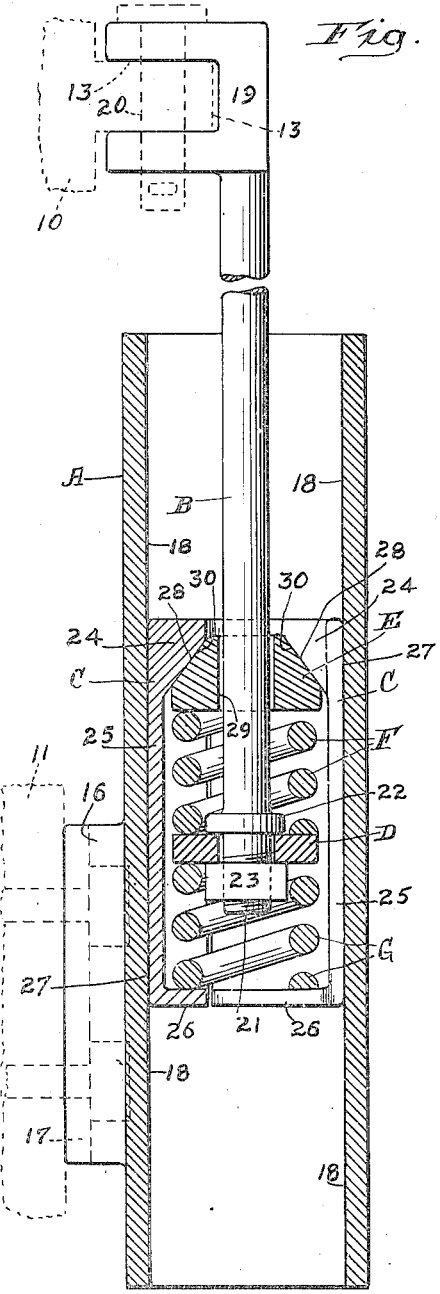
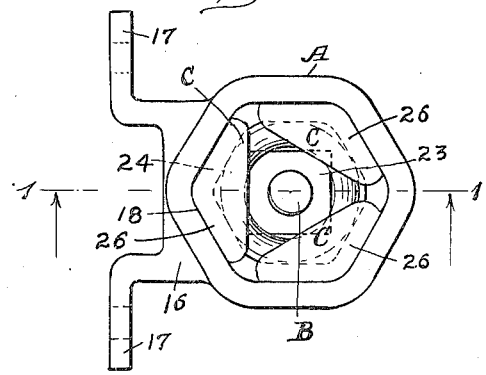
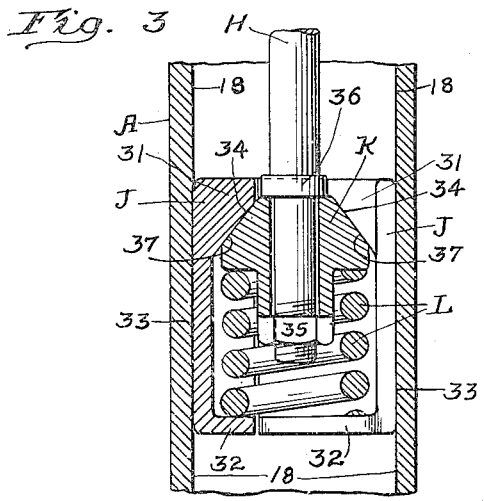
Inventor:
George E. Dath.
By Henry Fuchs.
Atty.

Patented Sept. 6, 1949

2,481,006

UNITED STATES PATENT OFFICE 2,481,006

FRICTION SHOCK ABSORBER

George E. Dath, Mokena, Ill., assignor to W. H. Miner, Inc., Chicago, Ill., a corporation of Delaware Application May 20, 1946, Serial No. 671,064

3 Claims. (Cl. 188—129)

This invention relates to improvements in friction shock absorbers, particularly adapted for snubbing the action of railway car truck springs.

One object of the invention is to provide a friction shock absorber of the character indicated which is actuated by relative approach and separation of the relatively movable members of the car truck between which the truck springs react, comprising a friction casing fixed to one of said members, a friction clutch slidingly telescoped within the casing, and an actuating rod for the clutch fixed to the other of said members, wherein the clutch includes a plurality of friction shoes having sliding engagement with the interior wall of the casing, a wedge block having wedging engagement with the shoes, and spring means reacting between the shoes and wedge block for wedging the shoes apart to hold the same in frictional contact with the interior wall of the casing.

Other objects of the invention will more clearly appear from the description and claims hereinafter following.

In the drawing forming a part of this specification, Figure 1 is a longitudinal, vertical sectional view of my improved shock absorber showing the application of the same to a railway car truck of the passenger car type, the portions of the relatively movable side frame member and equalizer bar of the truck being indicated in dotted lines, said view corresponding substantially to the line 1—1 of Figure 2. Figure 2 is a bottom plan view of the shock absorber shown in Figure 1. Figure 3 is a view, similar to Figure 1, partly broken away, illustrating another embodiment of the invention.

In said drawing, as shown in Figure 1, 10 indicates a portion of the side frame at one side of a railway passenger car truck, and 11 a portion of the usual equalizer bar, which is at the same side of said truck. As is well understood by those skilled in this art, the side frame and the equalizer bar of a passenger car truck have movement toward and away from each other in service, approaching as the truck springs are compressed and receding during recoil of said springs.

In carrying out my invention, my improved shock absorber is attached to the car truck in such a manner that it reacts between the truck side frame and the equalizer bar to snub the action of the truck springs. In order to provide means for attachment of the shock absorber to the truck side frame, the latter is provided with a laterally projecting lug 13.

Referring first to the embodiment of the invention illustrated in Figures 1 and 2, my improved shock absorber comprises broadly a friction casing A; an actuating rod or bar B; three friction shoes C—C—C; a spring follower disk D; a wedge block E; and a pair of springs F and G.

The friction casing A is in the form of a tubular sleeve of hexagonal, transverse cross section, open at both ends. Adjacent the lower end thereof, the casing A has a laterally projecting bracket 16 which is provided with laterally projecting, spaced, perforated ears 17 by which the casing is secured to the equalizer bar 11, suitable securing elements extending through the perforations of the ears being provided for fixing the bracket to the bar 11. The interior wall of the casing provides friction surfaces 18 of V-shaped, transverse cross section extending lengthwise of the same.

The actuating rod B is of substantially cylindrical, transverse cross section and extends into the casing A through the open upper end thereof. At the upper end, the rod B has a laterally projecting head 19 which is forked, as clearly shown in Figure 1, to embrace the lug 13 of the side frame. To fix the rod B to the side frame, the head 19 is secured to the lug 13 by means of a pin 20 or any other well-known securing element extending through the forked portion of said head. The lower end of the rod B is threaded, as indicated at 21. A collar 22 formed by a flange laterally projecting from the rod is provided above the threaded portion thereof, the collar 22 being spaced a short distance from the inner ends of the thread. A nut 23 is threaded on the lower end of the rod and serves to clamp the follower disk D to the rod.

The follower disk D is in the form of a washer, which is mounted on the rod B, and is clamped between the collar 22 and the nut 23. As will be evident, the follower disk D is thus, in effect, fixed to the rod and movable in unison therewith.

The three friction shoes C—C—C are arranged symmetrically about the axis of the mechanism and are slidingly telescoped within the casing A. These three shoes are of similar design, each shoe being in the form of an elongated slide having an enlarged portion or head 24 at the upper end, a stem 25 depending from said head, and an inturned abutment flange 26 at the lower end of the stem. On the outer side, each shoe has a lengthwise extending, transversely V-shaped friction surface 27 which engages the corresponding friction surface 18 of the casing. The head 24 of each shoe is provided with a downwardly facing wedge face 28 on the inner side, which cooperates with the wedge block E.

The wedge block E, which is disposed centrally between the shoes C—C—C is loosely mounted on the rod B, being provided with a central opening 29 therethrough which accommodates the rod. At the upper end, the wedge block E is provided with three wedge faces 30—30—30 which cooperate with and are correspondingly inclined to the three wedge faces 28—28—28 of the shoes.

The spring F is in the form of a helical coil surrounding the lower end of the rod B and has its top and bottom ends bearing respectively on the underneath side of the wedge block E and the top side of the follower disk D.

The spring G is also in the form of a helical coil and is interposed between the follower disk D and the inturned flanges 26—26—26 of the shoes C—C—C, having its top end bearing on the underneath side of the follower disk D and its lower end bearing on the flanges 26 of the shoes. The springs F and G are preferably under initial compression and wedge the block E against the wedge faces of the shoes C—C—C, thus holding the clutch member formed by these elements in yieldingly expanded condition.

The operation of the improved shock absorber shown in Figures 1 and 2 is as follows: Upon compression and recoil of the truck springs of the railway car and movement of the truck side frame and equalizer bar toward and away from each other, the actuating rod B and the casing A, being fixed respectively to the side frame 10 and the equalizer bar 11, will be moved therewith toward and away from each other, thus effecting sliding movement of the clutch, comprising the shoes C—C—C and the wedge E, lengthwise in the casing A, producing the desired snubbing action of the truck springs. During compression of the truck springs, as the rod B is moved downwardly within the casing A, the spring G will be slightly compressed and the spring F slightly expanded until the static frictional resistance between the shoes and casing is overcome, whereupon the shoes begin to move downwardly and the springs F and G assume their normal balanced condition. During the further movement of the rod B, the shoes C—C—C will move in unison therewith, providing the desired snubbing action by the sliding frictional engagement of the shoes with the casing. As will be evident, during the initial action hereinbefore described, while the spring G is being slightly compressed, purely spring resistance is provided which takes care of slight oscillations of the truck springs. This preliminary spring action also occurs when the rod B is pulled upwardly upon recoil of the truck springs, the spring F being slightly compressed until the static frictional resistance between the shoes and casing is overcome.

Referring next to the embodiment of the invention illustrated in Figure 3, the construction is the same as that shown in Figures 1 and 2 with the exception that the friction clutch is of slightly different design.

The improved shock absorber, as shown in Figure 3, comprises broadly a casing in all respects similar to the casing A and also indicated by A, an actuating rod H which is secured to the truck side frame in the same manner as the rod B hereinbefore described, three friction shoes J—J—J, a central wedge block K, and a spring L.

The three friction shoes J—J—J are of similar design, each shoe being in the form of an elongated slide, having a head 31 at its upper end and an inturned flange 32 at its lower end. On the outer side, each shoe has a transversely curved friction surface 33 extending lengthwise thereof and slidably engaging the interior friction surface 18 of the casing A. The head 31 of each shoe has a wedge face 34 on its inner side with which the wedge block K engages. The wedge block K is mounted on the rod H and moves in unison therewith, being clamped thereon between a nut 35 at the lower end of the rod and an annular flange 36 on said rod engaging the upper end of the wedge block. The block K has three wedge faces 37—37—37 which engage the wedge faces 34—34—34 of the shoes.

The spring L, which is preferably under initial compression, is interposed between the lower side of the wedge block K and the flanges 32—32—32 of the shoes J—J—J and acts to force the wedge block against the shoes to wedge the latter apart.

The operation of the improved shock absorber shown in Figure 3 is substantially the same as the operation of the shock absorber shown in Figures 1 and 2, with the exception that there is no preliminary spring action on the upstroke of the rod H, the wedge being directly actuated by the rod. During compression of the truck springs and the downstroke of the rod H, the wedge is also directly actuated by the rod and pressed against the spring L. At the beginning of the downstroke of the rod H, there is a slight initial compression of the spring L before the static friction existing between the shoes and the casing is overcome, thus providing preliminary spring action for slight compression of the truck springs, followed by higher resistance by the friction shoes sliding on the friction surfaces of the casing to take care of greater compression of said truck springs as soon as the static friction has been overcome and the shoes begin to move.

I claim:

1. In a friction shock absorber, the combination with a friction casing having a lengthwise disposed, interior friction surface; of a plurality of friction shoes within the casing, each shoe having an outer friction surface in sliding frictional engagement with the friction surface of the casing, each shoe having an inner wedge face at one end and an inturned abutment flange at the other end; a wedge block having wedge faces in wedging engagement with the wedge faces of said shoes; a follower member floating between said wedge block and flanges of the shoes; spring means reacting between said wedge block and abutment flanges of the shoes comprising a coil spring bearing at opposite ends on said block and follower member and a second coil spring bearing at opposite ends on said follower member and flanges of the shoes; and a reciprocating operating rod movable inwardly and outwardly lengthwise of the casing fixed to said follower member.

2. In a friction shock absorber, the combination with a friction casing having an interior, lengthwise extending friction surface; of a plurality of friction shoes within the casing in lengthwise sliding engagement with the friction surface thereof, said shoes having inner wedge faces at one set of ends thereof and inturned abutment flanges at the opposite set of ends; a wedge block having wedge faces in wedging engagement with the wedge faces of the shoes; a spring bearing at one end on said wedge block; a follower bearing at one side on the other end of said spring; a second spring bearing at one end on the opposite side of said follower and at its other end on the abutments of said shoes; and a reciprocating actuating rod slidable lengthwise within the casing having said follower rigidly fixed thereto.

3. In a friction shock absorber, the combination with a friction casing having an interior friction surface extending lengthwise thereof; of an actuating rod extending into the casing and movable lengthwise thereof in reverse directions; a fixed follower on said rod; a plurality of friction shoes, each shoe having a wedge face at one end on the inner side thereof and an inturned abutment at the other end opposed to said wedge face; a wedge block having wedge faces in wedging engagement with the wedge faces of said shoes; and a pair of springs, one of said springs being interposed and reacting between said follower and wedge block and the other spring being interposed and reacting between said follower and the abutments of said shoes, said pair of springs holding the wedge in wedging engagement with the shoes.

GEORGE E. DATH.

REFERENCES CITED

The following references are of record in the file of this patent:

UNITED STATES PATENTS

| Number | Name | Date |
|---|---|---|
| 1,181,918 | O'Connor | May 2, 1916 |
| 2,398,749 | Light | Apr. 16, 1946 |

FOREIGN PATENTS

| Number | Country | Date |
|---|---|---|
| 734,266 | France | Oct. 19, 1932 |